June 14, 1955　　D. F. WINTER　　2,710,519
ADJUSTABLE ROTARY RAKE AND STUBBLE CLEANER
Filed July 24, 1952　　2 Sheets-Sheet 1

Daniel F. Winter
INVENTOR.

June 14, 1955     D. F. WINTER     2,710,519
ADJUSTABLE ROTARY RAKE AND STUBBLE CLEANER
Filed July 24, 1952     2 Sheets-Sheet 2

Daniel F. Winter
INVENTOR.

BY
*Clarence A. O'Brien*
*and Harvey B. Jackson*
Attorneys

United States Patent Office 2,710,519
Patented June 14, 1955

2,710,519

ADJUSTABLE ROTARY RAKE AND STUBBLE CLEANER

Daniel F. Winter, Ceylon, Minn.

Application July 24, 1952, Serial No. 300,598

6 Claims. (Cl. 56—377)

This invention comprises novel and useful improvements in an adjustable rotary rake and stubble cleaner, relating to similar subject matter to that set forth in my prior patent, No. 2,588,599, issued on March 11, 1952, for Rotary Rake and Stubble Cleaner and constitutes an improvement thereover.

The primary object of this invention is to provide an adjustable rotary rake and stubble cleaner which is adapted to be mounted upon a tractor or a tractor-drawn plow in an improved manner for brushing stubble in windrows or spreading the same upon a plowed furrow.

A further object of the invention is to provide a rotary rake and stubble cleaner wherein the rake is adapted to be rotated solely by its engagement with the surface of the ground as the tractor moves over the ground, and wherein the ground engaging pressure upon the rake may be yieldingly maintained by a spring and may be readily adjusted as desired.

A further important object of the invention is to provide a rotary rake and stubble cleaner having an improved mounting means and an improved pressure adjusting means for the rake over that disclosed in my above-mentioned prior patent.

These, together with various ancillary features and objects of the invention, which will later become apparent as the following description proceeds, are attained by the present invention, preferred embodiments of which have been illustrated, by way of example only, in the accompanying drawings, wherein.

Figure 1:
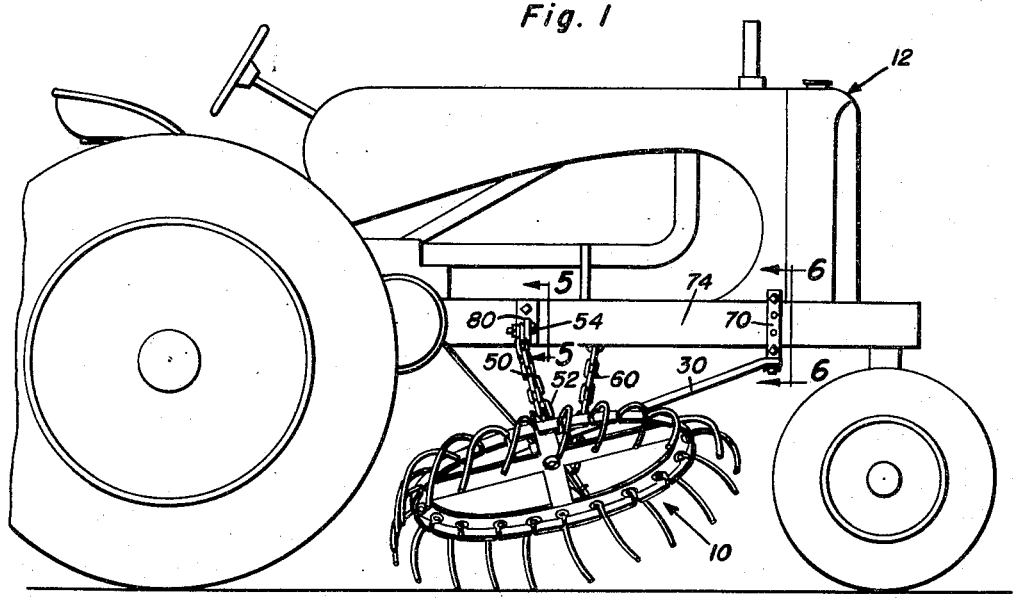
Figure 1 is a side elevational view showing the rotary rake and stubble cleaner mounted upon the supporting frame of a tractor in operative position thereon.
Figure 5:
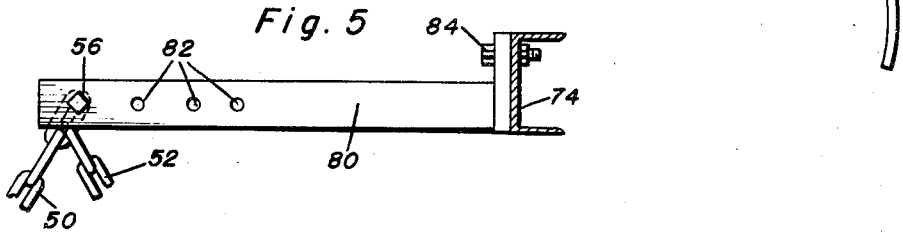
Figure 6:
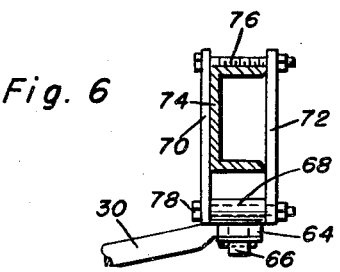

Figure 5 is an enlarged vertical transverse sectional view taken substantially upon the plane indicated by the section line 5—5 of Figure 1 and illustrating the manner in which the rotary rake and stubble cleaner is detachably secured to the framework of a tractor, as shown in Figure 1; and, Figure 6 is an enlarged vertical transverse sectional detail view taken substantially upon the plane indicated by the section line 6—6 of Figure 1 and showing a further clamping means for securing the rotary rake assembly to the framework of a tractor as shown in Figure 1.

The present invention relates generally to the subject matter set forth in my prior patent, No. 2,588,599, but differs therefrom chiefly in the provision of an adjustable resilient means for yieldingly urging the teeth of the rake into contact with the ground; together with an improved supporting means for journaling the rake; and improved means for mounting the rake assembly upon a tractor and for adjusting the spring tension applied to the rotary rake.

Figure 4:
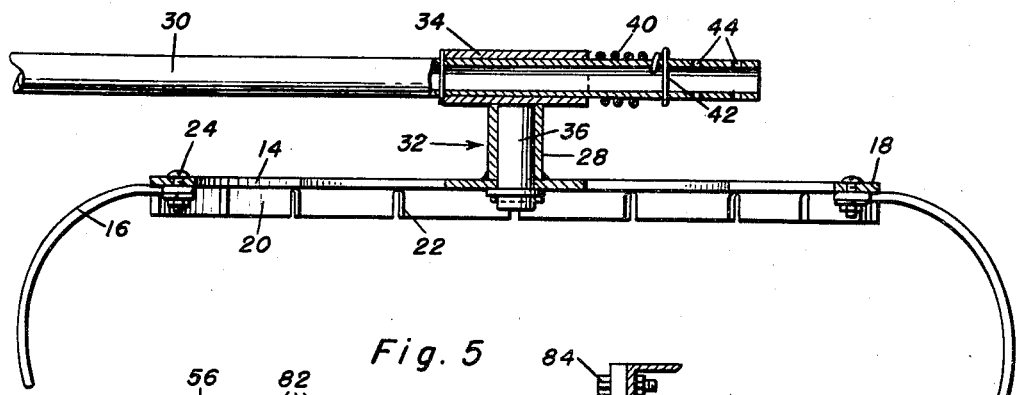
Figure 4 is a vertical longitudinal sectional view taken substantially upon the plane indicated by the section line 4—4 of Figure 3 and showing further details of the manner of rotatably supporting the rake and stubble cleaner and for applying adjustable spring pressure thereto.

Referring first to the embodiment illustrated in Figure 1, it will be seen that the rotary rake assembly indicated generally by the numeral 10 is shown mounted beneath the framework of a tractor indicated generally by the numeral 12 and between the front and rear wheels thereof. The rake assembly itself may conveniently be of the character and type disclosed in my above-identified patent; and includes a rim 14 having a plurality of resilient rake teeth 16 removably secured thereto. In the form of rake illustrated in this application, it will be seen by reference to Figure 4 that the rim 14 consists of an annular angle iron member, having a flat annulus 18 upon which depends a perpendicular annular flange 20, the latter having a plurality of radially disposed notches 22 therein through which the rake teeth 16 extend, these teeth being secured to the annulus 18 as by fastening bolts 24. In Figure 4 certain of these teeth have been omitted from the rim 14 in order to simplify the illustration in that view of the drawings.

Figure 3:
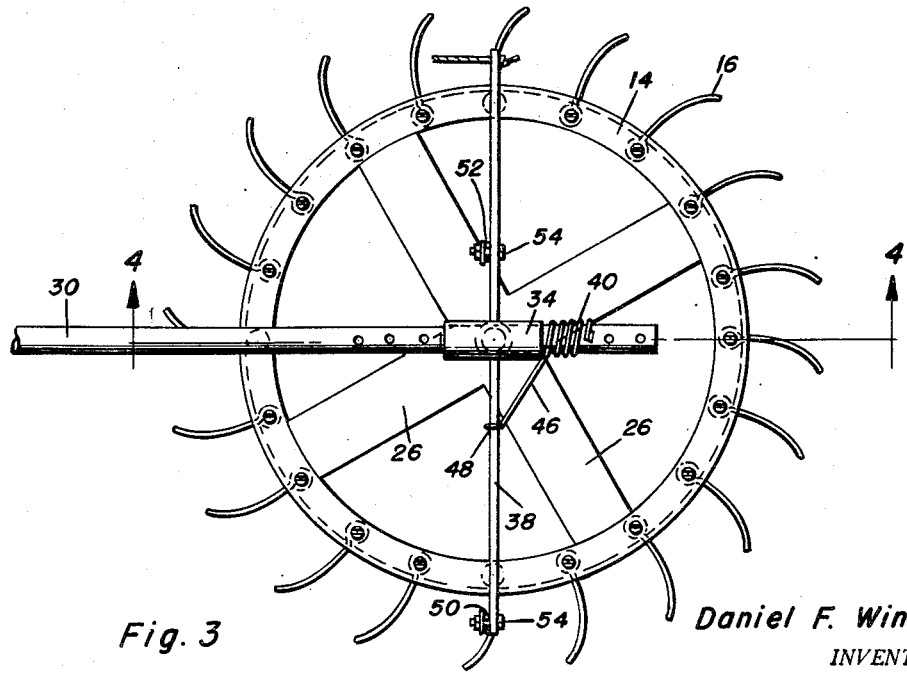
Figure 3 is an enlarged top plan view of the rotary rake and stubble cleaner together with the supporting means for the same of either of the embodiments of Figures 1 and 2.

A plurality of spokes 26 are secured to the rim 14 and at their central portion have welded or otherwise rigidly secured thereto a bushing or sleeve 28 constituting a hub for the rotary rake. As shown in Figure 3, the spokes may conveniently consist of a single cruciform shaped member.

An axle or drawbar 30 which may conveniently consist of a hollow rod or shaft is provided for adjustably supporting the rotary rake as set forth hereinafter. This axle or drawbar is adapted to be removably secured to a tractor 12 or alternatively, as shown in Figure 2, to the beam of a plow attached to the tractor for supporting the rotary rake therefrom.

Figure 2:
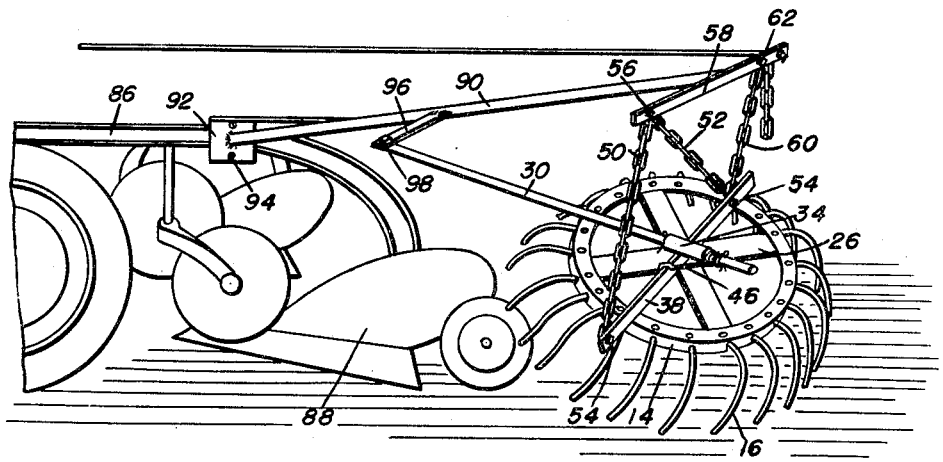
Figure 2 is a view similar to Figure 1 but showing the rotary rake and stubble cleaner mounted upon the plow-beam of a plow attached to a tractor, with the modified mounting and supporting means from that shown in Figure 1.

The manner in which the rotary rake is mounted upon the axle or drawbar 30 and the means for this purpose are identical in both of the modified arrangements of Figures 1 and 2. Accordingly, it is to be understood that the illustration of Figures 3 and 4 are equally applicable to the mounting arrangements of both Figures 1 and 2.

A body is provided for rotatably supporting the rake upon the axle or drawbar. This body preferably consists of a T-shaped member, indicated generally by the numeral 32, and comprising a transverse sleeve or bushing 34 which constitutes the arm of the T and comprises a journal which is freely rotatably received upon the axle or drawbar 30, together with a perpendicularly disposed integral spindle 36 attached to the mid-portion of the journal 34 and constituting the stem of the T, this spindle rotatably receiving the hub 28 thereon, the hub being retained by any suitable fastening means. By this arrangement, it will be apparent that the body and the rake are freely rotatable about the axis of the axle 30, while the rake in turn is freely rotatable about the spindle 36 which is perpendicular to the axle or drawbar 30.

The journal portion 34 of the body is further provided with a transversely extending bar 38 which is rigidly attached to the journal 34 and projects from opposite sides thereof and overlies and extends radially beyond the circumference of the rim 14. This disposition of the bar 38 is clearly shown in Figures 2 and 3 and is likewise employed, although not so clearly shown, in the illustration of the embodiment of Figure 1.

At this point it shall be noted that the axle or drawbar 30 whether in the embodiment of Figure 1 or in that of Figure 2 is disposed in an inclined position with respect to a horizontal plane whereby the axis of the spindle and hub of the rake will be disposed in a vertical plane through the axle or drawbar 30, but will be tilted with respect to a vertical plane. When the axle or drawbar is supported properly upon a tractor or a plow attachment drawn thereby, the rake will be so positioned that the teeth of the rake will engage the ground at one point only, whereby forward movement of the tractor or the implement carried thereby will cause rotation of the rake. The rake is so positioned with respect to the tractor or plow attachment carried thereby that this rotation of the rake will windrow stubble or the like upon the ground and dispose the same either in advance of or upon the furrow being opened by the plow.

It frequently becomes desirable to apply a yielding pressure to the rake to cause the teeth to firmly engage the ground and thus insure rotation of the rake while the same is performing the windrowing and suitable gathering operation. This important desideratum is obtained in the present invention by the use of a spring which also serves to releasably secure the rake and the body carrying the same to the axle in axially adjusted position thereupon. This spring includes a coil consisting of a plurality of convolutions as shown at 40, these convolutions embracing the axle or drawbar 30 adjacent the journal 34, with the end convolution abutting against the end of the journal. One end of the spring has its extremity 42 insertable selectively in a plurality of axially spaced diametrical bores 44 formed in the axle or drawbar 30 whereby one end of the spring will be anchored thereon. The other end of the spring comprises an arm 46 terminating in a hook 48 which is adapted to be engaged over the bar 38. The inherent resiliency of the spring is such that the torsional bias of the convolutions 40 will tend to yieldingly urge the journal 34 in rotative movement about the axle or drawbar 30. The spring will thus yieldingly urge the rake teeth against the ground to impart a desired yielding drag therebetween. The tension of the spring can be readily adjusted by additional rotation of the axle or drawbar 30 thereby imparting additional bias or torsion to the convolutions of the spring and increasing the drag of the teeth upon the ground.

Adjusting means are provided for limiting the extent of rotation of the rake about the axle or drawbar 30. Such adjusting means may conveniently comprise a pair of chains 50 and 52 which have their lower ends secured as by fastening bolts 54 to the bar 38 and at their upper ends are secured by a bolt 56 to an arm 58 to be hereinafter further described. An additional chain 60 secured to one of the bolts 54 on the bar 38 is adjustably secured by a bolt 62 to a portion of the above-mentioned arm 58. Obviously, by adjustment of the chains through these bolts, rotative movement of the rake about the axle may be limited as desired.

The construction as so far described is common to both of the embodiments of Figures 1 and 2. In the embodiment of Figure 1, however, as shown best in Figure 6, the end of the axle 30 which is remote from the rake and body carrying the same, is provided with an eye 64 received upon a pin 66 depending from a sleeve or bushing 68. The latter is disposed between a pair of clamping brackets 70 and 72 which embrace the frame member 74 of the tractor 12, being clamped thereon as by bolts 76 and 78. The sleeve 68 is received upon the bolt 78 and is disposed between the plates 70 and 72. By this means, the front end of the axle 30 is securely mounted upon and carried by the frame member 74 of the tractor, extending rearwardly, downwardly and laterally therefrom. The above-mentioned chains 50, 52 and 60 support the other end of the axle by their engagement with the bar 38. In this embodiment of the invention, the chains 50 and 52, as shown in Figure 5, have their supporting bolt 56 connected to a lateral arm 80 by means of a series of axially spaced perforations 82 therein, the arm in turn being secured as by bolt means 84 to the frame member 74 previously mentioned.

In the embodiment of Figure 2, however, a somewhat different type of support means is provided whereby the rotary rake may be mounted upon the plowbeam 86 of a plow assembly 88 attached to the tractor. For this purpose there is provided a rod 90 which at one end has rigidly attached thereto the above-mentioned cross arm 58. At its other end, the rod 90 is provided with a bracket 92 which is adapted to be clamped upon the plowbeam 86 as by means of bolts 94. Extending from the rod 90 is an arm 96 having at its end a bolt 98 adapted to be engaged in the above-mentioned eyelet in the extremity of the drawbar 30.

By disengaging the bolt 98, the shaft 30 may be rotated in order to adjust the torsion of the spring 40 and may be then reconnected to the arm 96. By this means, an adjustable spring tension may be maintained upon the rake to impart a controlled and adjustable drag of the same upon the ground.

By the foregoing invention, there has been provided a rotary windrowing and stubble gathering rake which may be conveniently mounted upon an existing farm tractor or plow assembly carried thereby. The position of the rake may be readily adjusted in order to cause the same to effectively windrow stubble or chaff or the like into the line of travel of a plow, either before the plow or in the furrow made by the plow depending upon the positioning of the device. Further, the invention admits of ready adjustment of the pressure of the rake upon the ground thereby greatly facilitating the precision of its performance and the efficiency of its use.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having thus described the invention, what is claimed as new is:

1. A stubble cleaner comprising a rotary rake having radially outwardly extending teeth and a hub, an axle supporting said rake in predetermined position relative to the ground, a body rotatable upon said axle and rotatably supporting said hub, a support for said axle, said body having a rigidly attached bar extending transversely on opposite sides thereof, a spring operatively engaging said body and axle and urging said rake about said axle and into yielding contact with the ground, said spring being fixedly secured to said axle and to said bar.

2. A stubble cleaner comprising a rotary rake having radially outwardly extending teeth and a hub, an axle supporting said rake in predetermined positoin relative to the ground, a body rotatable upon said axle and rotatably supporting said hub, a support for said axle, said body including a spindle, said hub being journaled upon said spindle, a spring operatively engaging said body and axle and urging said rake about said axle and into yielding contact with the ground, said body having a rigidly attached bar extending transversely on opposite sides thereof, said spring being fixedly secured to said axle and to said bar.

3. A stubble cleaner comprising a rotary rake having radially outwardly extending teeth and a hub, an axle supporting said rake in predetermined position relative to the ground, a body rotatable upon said axle and rotatably supporting said hub, a support for said axle, said support including a rod having a lateral arm, said body having a rigidly attached bar extending transversely on opposite sides thereof, said axle being connected to said arm, adjusting mechanism connected to said rod and to said bar for limiting rotary movement of said body and rake about said axle.

4. A stubble cleaning rake comprising a drawbar adapted to be vertically pivotally attached to a vehicle, a sleeve journalled on an end portion of said drawbar, a spindle normally connected to said sleeve and including a rotary rake journalled thereon, yielding means operatively interconnected to said sleeve and said rake to cause journalling of said rake about said drawbar, whereby when said rake is in normally operative position one lateral side will contact the ground and the other lateral side will be elevated therefrom.

5. A stubble cleaning rake comprising a drawbar adapted to be vertically pivotally attached to a vehicle, a sleeve journalled on an end portion of said drawbar, spindle and hub members normally operably connected to said sleeve, one of said members including a rotary rake journalled thereon, yieldable means operatively connected to said sleeve and rake to cause journalling of said rake about said drawbar, whereby when said rake is in normal operative position one lateral side will be urged to contact the ground and the other lateral side will be elevated therefrom.

6. A stubble cleaning rake as set forth in claim 5 wherein said yielding means includes an adjustable torsion spring interconnected with said sleeve and rake.

References Cited in the file of this patent

UNITED STATES PATENTS

| | | |
|---|---|---|
| 740,911 | Peto | Oct. 6, 1903 |
| 866,326 | Blackstone et al. | Sept. 17, 1907 |
| 1,095,966 | Hayden | May 5, 1914 |
| 2,504,259 | Ford | Apr. 18, 1950 |
| 2,588,599 | Winter | Mar. 11, 1952 |

FOREIGN PATENTS

| | | |
|---|---|---|
| 5,693 | Great Britain | 1908 |
| 16,403 | Great Britain | 1911 |
| 617,583 | France | Nov. 22, 1926 |